United States Patent [19]

Mizutani et al.

[11] Patent Number: 5,493,674
[45] Date of Patent: Feb. 20, 1996

[54] ELECTRONIC APPARATUS

[75] Inventors: Masao Mizutani; Tomonari Sagane, both of Kanagawa, Japan

[73] Assignee: Sony Corporation, Tokyo, Japan

[21] Appl. No.: 140,598

[22] Filed: Oct. 21, 1993

[30] Foreign Application Priority Data

Oct. 23, 1992 [JP] Japan .................... 4-309452

[51] Int. Cl.$^6$ .............................. G06F 11/34; G06F 1/00; G06F 3/00; H04N 5/95
[52] U.S. Cl. ................. 395/182.04; 395/550; 364/941.5; 358/337
[58] Field of Search ..................... 395/575, 425, 395/550, 725; 371/10.1, 10.2; 364/941, 941.5, 960.4, 970.1, 970.3, 251, 251.4; 358/320, 327, 337

[56] References Cited

U.S. PATENT DOCUMENTS

| | | | |
|---|---|---|---|
| 4,542,453 | 9/1985 | Patrick et al. | 364/200 |
| 4,745,572 | 5/1988 | Wilburn | 364/900 |
| 4,751,703 | 6/1988 | Picon et al. | 371/10 |
| 4,802,119 | 1/1989 | Heene et al. | 364/900 |
| 4,831,517 | 5/1989 | Crouse et al. | 364/200 |
| 4,982,360 | 1/1991 | Johnson et al. | 364/900 |

*Primary Examiner*—Robert W. Beausoliel, Jr.
*Assistant Examiner*—Trinh Tu
*Attorney, Agent, or Firm*—Limbach & Limbach; W. Patrick Bengtsson

[57] ABSTRACT

In control using a patch correctable microcomputer, the patch correction can have no effect on the timing of the control operation of the micro computer. Call instructions CALL 1, CALL 2 . . . for shifting, in synchronism with the operation of the microcomputer, over to a patch correction program in a RAM, are intermittently inserted into a control program stored in a ROM. A reciprocal number of invalid instructions NOP are put after this patch correction program in accordance with the length of the patch correction program. After a patch correction program has been carried out, the program in the ROM is returned to after a passage of time set according to the number of invalid instructions, so that the time for execution of the program in the RAM which is based on the microcomputer call instruction can be made constant irrespective of the length of time of the patch correction program, and will therefore have no effect on the timing for carrying out the program in the ROM.

10 Claims, 4 Drawing Sheets

ELECTRONIC APPARATUS

BACKGROUND OF THE INVENTION

1. Field of the Invention

The present invention relates to an electronic apparatus, such as a single chip microcomputer, which is suitable for use with electronic equipment to be controlled thereby.

2. Description of the Related Art

With electronic equipment such as commercial video cam-corder and miniaturized video decks, single chip microcomputers mounted within the main body of the electronic equipment have conventionally been used to provide control of all or part of this kind of electronic equipment.

This kind of single chip microcomputer usually has a structure consisting of commonly known items such as a central processing apparatus (CPU) for carrying out processes such as control of accesses to the storage means and arithmetic processes, storage apparatus such as a read only memory (ROM) for permanently storing information, and a random access memory (RAM) capable of reading and writing and peripheral circuits such as input/output ports. All of these structures are generally integrated onto a single chip.

Electronic apparatus having this kind of single chip integration has an advantage in that large scale cost reduction can be realized due to mass production. In addition to this, due to the fact that the size of program to be stored in a ROM has drastically increased as semiconductor integrating technology has advanced it has also become possible to control versatile and complicated items in accordance with the programs stored in the ROM.

Thus, it has become possible to control versatile and complicated items using a large amount of programs stored in the ROM. However, enlarging the size of the program stored in the ROM has resulted in the problem of generating bugs in the program.

Particularly, in the case where a bug is discovered after mass production, a production re-run is perform to produce bug-corrected microcomputers to replace those mounted in the electronic equipment, or alternatively, the electronic equipment is attached with a bug-correcting external part. Either of these alternatives have, however, been excessively expensive. In addition, as electronic equipment such as video cam-corders has a very high packing density, the attachment of external parts has virtually been impossible to carry out. The present invention has been made to solve these problems.

SUMMARY OF THE INVENTION

An object of the present invention is to provide an electronic apparatus which is capable of automatically avoiding the generation of bugs in a program stored in a ROM of the apparatus. According to the present invention, the architecture of an electronic apparatus such as a single chip microcomputer is made to meet mass production bugs in advance so that even when the mass production bugs are generated they can be automatically avoided by applying correction information once from outside without replacing the internal parts of the apparatus or attaching external parts thereto as has hitherto been the case.

In order to achieve the aforementioned object, the present invention provides an electronic apparatus, the structure of which is made up of fixed storage means for permanently storing information, input means for inputting correcting information for correcting information stored in a specific part of the fixed storage means, corrected information storage means for storing the correcting information inputted by the input means, central processing means for carrying out access control and arithmetic processing to the fixed storage means and the correcting information storage means, and access changing means for changing the access from the central processing means periodically between the fixed storage means and the correcting information storage means, wherein the correcting information includes patch correction data for correcting the information stored in a specific part of the fixed storage means and data (hereinafter referred to as the timing data) for adjusting the length of time during which the central processing means accesses the correcting information storage means.

In this case, the timing data can, more specifically, be made up from one or more stored invalid instructions, or alternatively, can be made up from data which determines the number of times a wait loop, which is carried out while the central processing apparatus is accessing the correction information storage means, is repeated.

In the case where the electronic equipment to be controlled is television equipment such as a video camcorder or a video deck, the vertical synchronization signal for the television could be used for synchronization when changing the access by the central processing means from the fixed storage means to the correction information storage means.

Where the central processing means controls the electronic equipment by using the control program in the fixed storage means, the access operation is periodically changed from the fixed storage means to the correction information storage means in the above-described manner. This means that with regards to the place where any bugs exist within the fixed storage means, the program for correcting the bug can be stored as patch correction data in the storage region of the correction information storage means to be accessed by the above mentioned changing operation. In this way, when the central processing apparatus changes an access from the fixed storage means to the correction information storage means, bugs can be corrected by executing this correction program.

Further, the patch correction data is stored together with the timing data in the correction information storage means. By then making the length of the adjustment time determined by the timing data to be reciprocal to the length of time for the patch correction process, the length of the time during which the central processing means is accessing the correction information storage means can be made constant irrespective of the length of the patch correction time. Thus, by so doing, the timing for controlling electronic equipment by the control program in the fixed storage means can be always constant irrespective of the length of time necessary for the patch correction thereby allowing a stable control to be performed.

DETAILED DESCRIPTION OF THE PREFERRED EMBODIMENTS

First Preferred Embodiment

One embodiment of the present invention will now be described with reference to the accompanying drawings especially when the invention is used for controlling a television.

Figure 1:
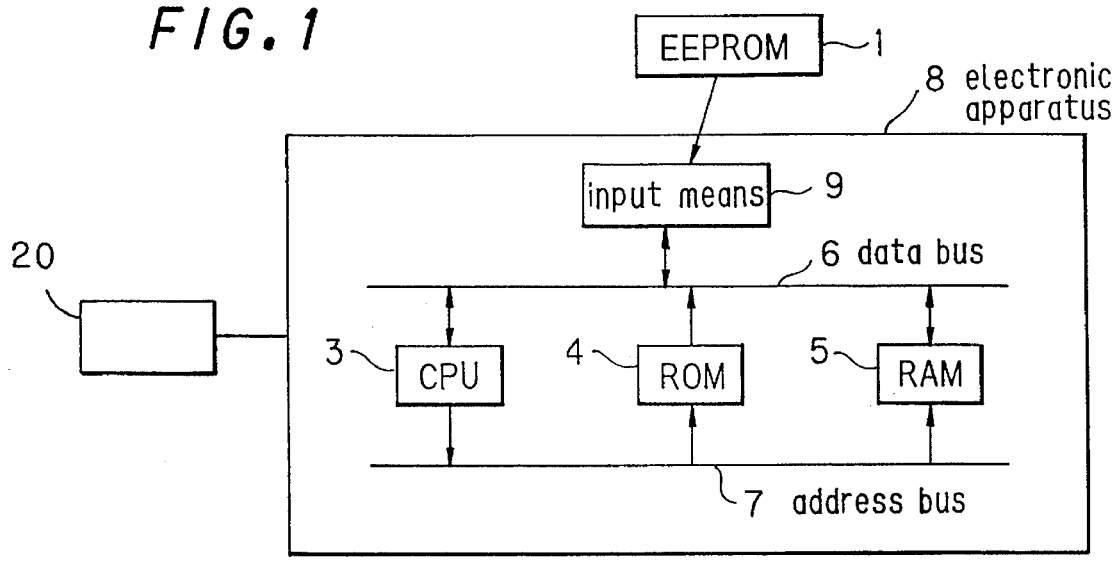
FIG. 1 is a block diagram of the basic structure of an embodiment of the present invention.

FIG. 1 is a block diagram of the basic structure of this embodiment.

An electronic apparatus 8 according to the present invention comprises a single chip microcomputer made up of a conventional CPU 3, RAM 5, ROM 4, data bus 6, address bus 7, an input apparatus 9 disposed within the microcomputer and an EEPROM 1 external storage apparatus which is externally connected to the microcomputer.

When a bug-corrected electronic equipment 20 is controlled by using the electronic apparatus 8, information such as timing data and patch correction data necessary for correcting the kind of bugs which are generated within the ROM 4 are stored beforehand within the external EEPROM 1.

Figure 2:
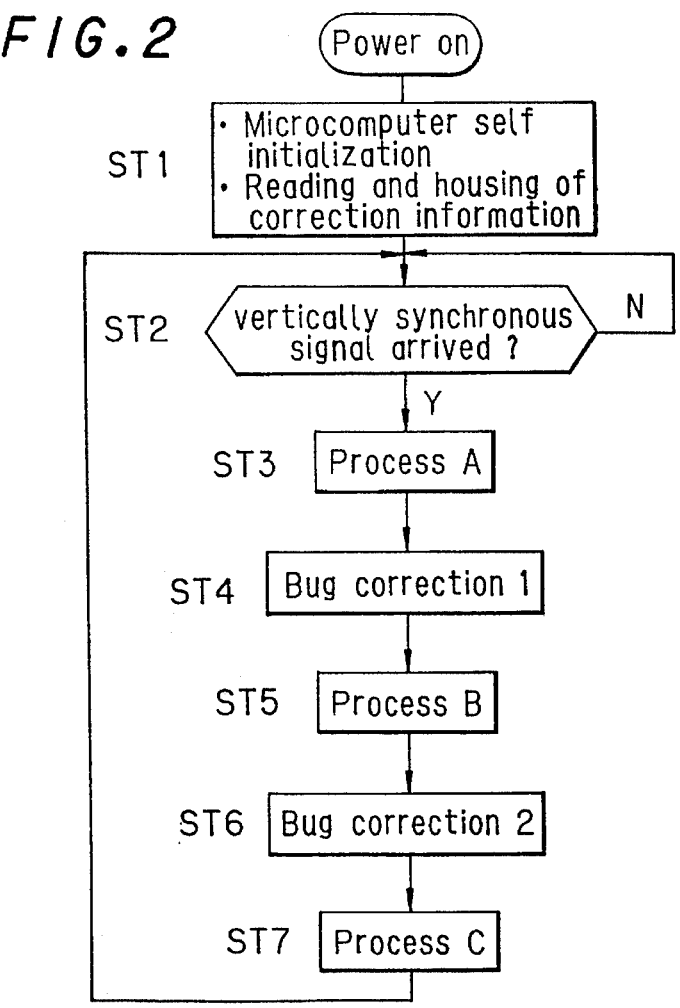
FIG. 2 is a flowchart showing the operation of the embodiment of FIG. 1.

FIG. 2 is a simplified flowchart of a case where electronic equipment 20 is controlled by this electronic apparatus 8 and the following is an explanation of the operation described in this figure.

First, the microcomputer for the electronic apparatus 8 is initialized by turning on the power supply i.e. the initialization of, for example, the RAM and various registers, and the initialization of communications functions and ports is carried out. Next, correction information comprising the above-mentioned two kinds of data stored in the EEPROM is read into the RAM (ST1)

Next, it is determined whether or not a vertical synchronization signal has arrived (ST2). If it is determined that a vertical synchronization signal has arrived, steps ST3 to ST7 are carried out and the arrival of a vertical synchronization signal is again waited for.

Process steps A–C represent various processes for controlling a television unit and the steps ST4 and ST6 represent processes for correcting bugs which occur in these processes. The execution of these steps ST3 to ST7 in the flowchart usually starts in synchronism with the vertical synchronization signal in accordance with the step ST2 which waits for the vertical synchronization signal.

Further, the specific program for bug correction is stored in the RAM as patch correction data and in order to execute bug correction, a call instruction for shifting over the process to the bug correction program in the RAM is input into a suitable place in the television control program written into the ROM.

Figure 3:
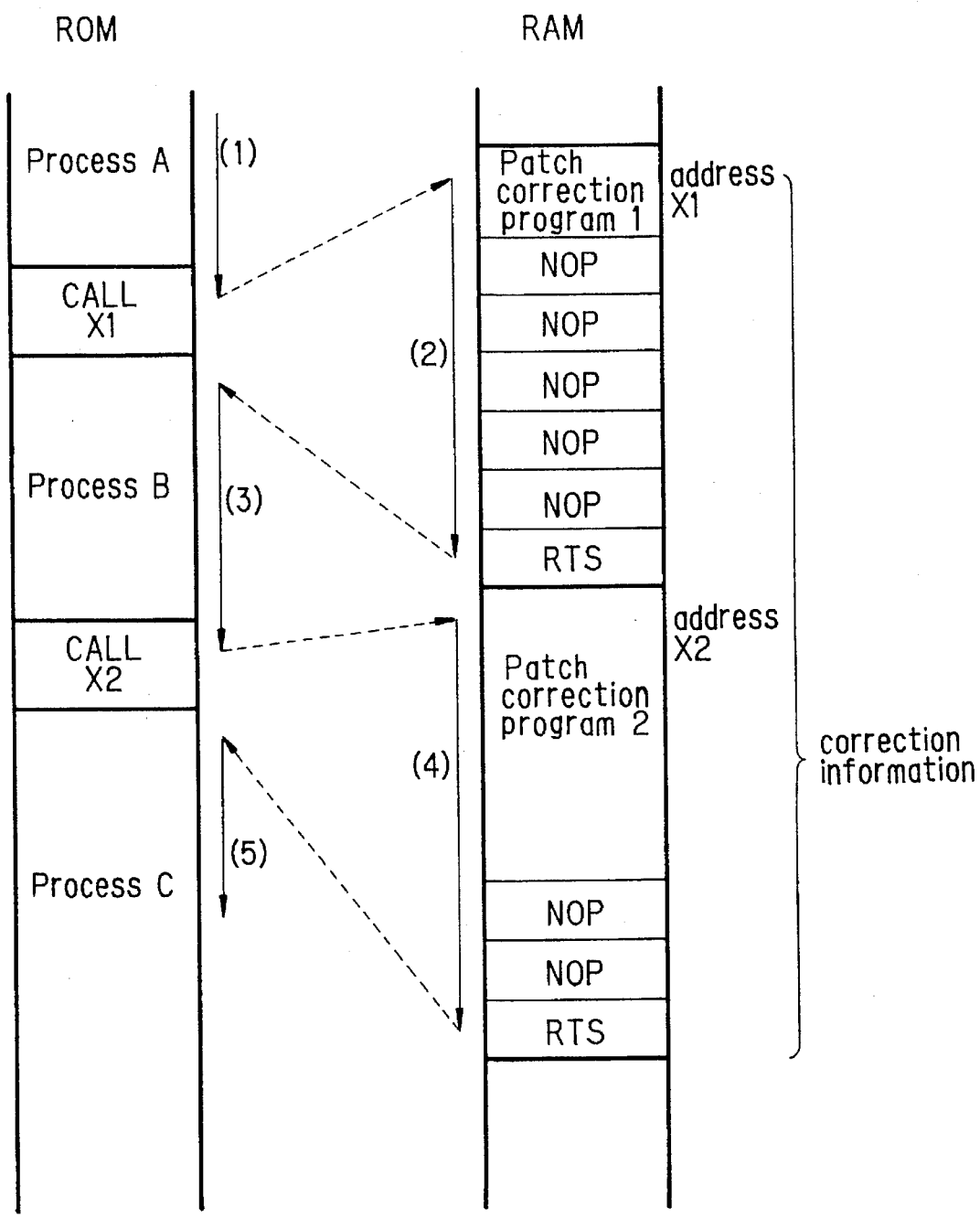
FIG. 3 is a diagram showing a flow of an address map occurring in the embodiment of FIG. 1.

If each of the steps ST3 to ST7 are put into a simplified diagram of the situation as it progresses through the address map in the ROM and RAM, FIG. 3 is obtained.

FIG. 3 shows the address map of the first preferred embodiment. After the program in the RAM for process A has been executed, the call instruction CALL X1 shifts the process over to the patch correction program 1. Next, after the process waits for a period of time in which a number of invalid NOP instructions as the timing data are received, the process returns to the ROM where it goes to the program for the process B. After this program for the process B has been carried out, as in the case of the patch correction program 1, a call instruction shifts the process over to the patch correction program 2, which is then carried out. The process then returns to the program for process C after the invalid instructions have been received. The sequence through which this process progresses is indicated by the numerals (1), (2), (3), (4) and (5) in FIG. 3.

In this figure, the process is set up so that the number of invalid NOP instructions which occur after the patch correction program is small if the patch correction program is long and is large if the patch correction program is short. The period of time in which the CPU for the electronic apparatus 8 receives a call instruction from the ROM, carries out bug correction and returns to the carrying out of the program stored in the ROM is usually fixed.

Thus, in the case of the present invention, the length of time for which the CPU is accessing the correction information storage apparatus in order to carry out bug correction is fixed, irrespective of how long or how short the patch correction program is. Also, as the time required to carry out the respective processes A and B has usually been designed to be substantially constant, the timing for carrying out the processes A, B and C can be fixed so as to be in synchronism with all of the vertical synchronization signals. In this way, it is possible to perform a television control always in a stabilized timing without being affected by the bug correction within the electronic apparatus.

Second Embodiment

The above is an example of time adjustment using invalid NOP instructions. The repeating of a wait loop could, however, also be used in place of this for carrying out time period adjustment. The following is a description of another embodiment for this case with reference to the address map of FIG. 4 and the flowchart of FIG. 5.

Figure 4:
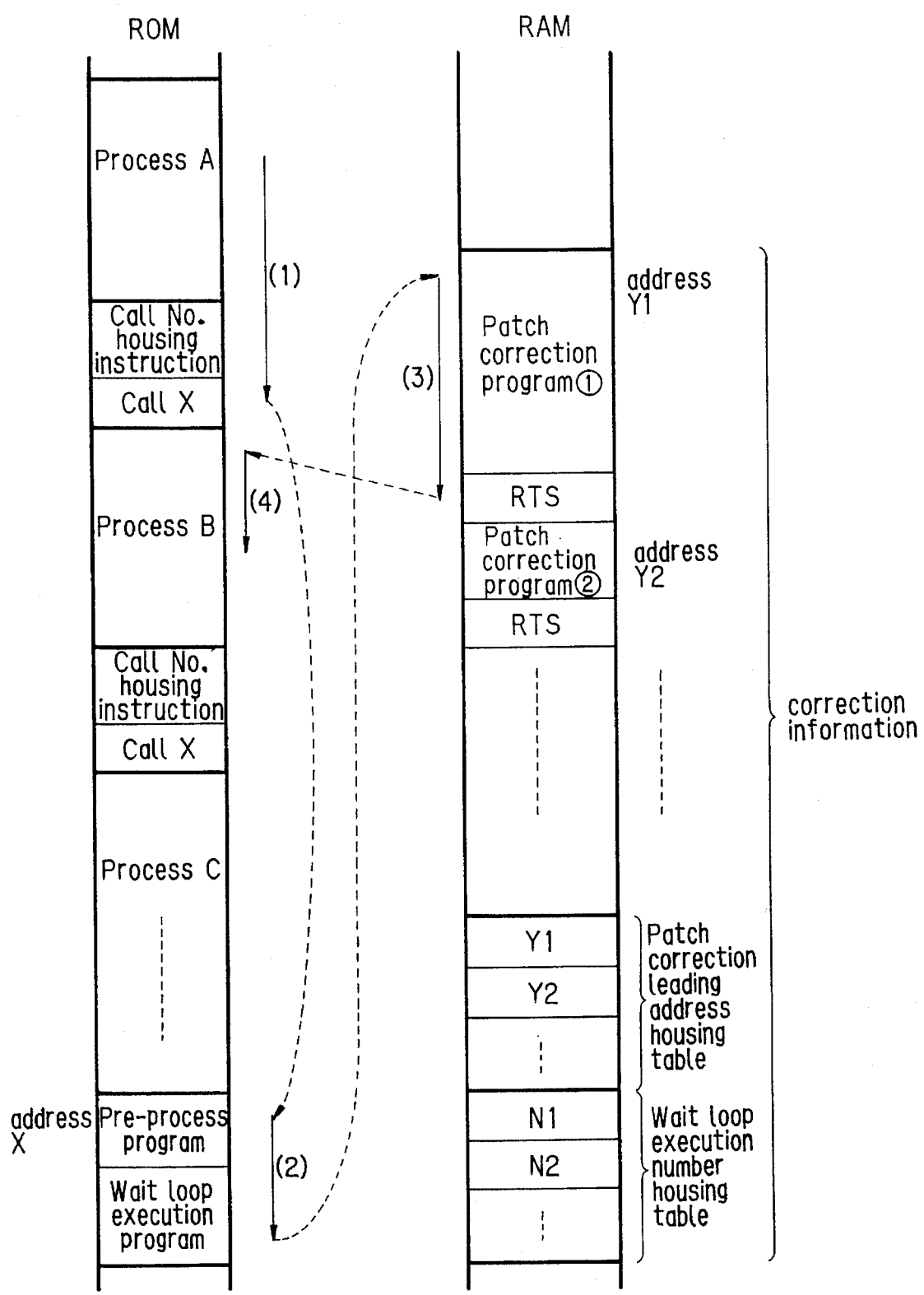
FIG. 4 is a diagram showing a flow of an address map occurring in a further embodiment of the present invention.

In this embodiment, as shown in FIG. 4, a program for executing a repeating loop for the time adjustment is put in the ROM beforehand. When the CPU for the electronic apparatus 8 receives a bug-correcting call X instruction which is inserted into the television control program while the CPU is executing the program, the wait loop repeat program is executed. The control program in the ROM is then returned to after the patch correction program in the RAM has been executed.

Here, the number of times the wait loop is repeatedly executed is small if the patch correction is long. For example, as shown in FIG. 4, the sum of the period of time necessary to execute the process (2) and the period of time necessary to execute the the process (patch correction) (3) is so set as to become always constant, whichever patch correction is executed.

Also, the number of times a wait loop is to be repeated before the execution of each patch instruction is stored in the form of a table within the correction information in the RAM. The leading addresses for each of the patch correction programs in the RAM are also stored in the form of a table within the correction information in the same way.

Further, as is shown in FIG. 4, a program for executing a pre-process which becomes necessary prior to the execution of the wait loop and the patch correction is placed in the ROM before the program for executing the wait loop.

Figure 5:
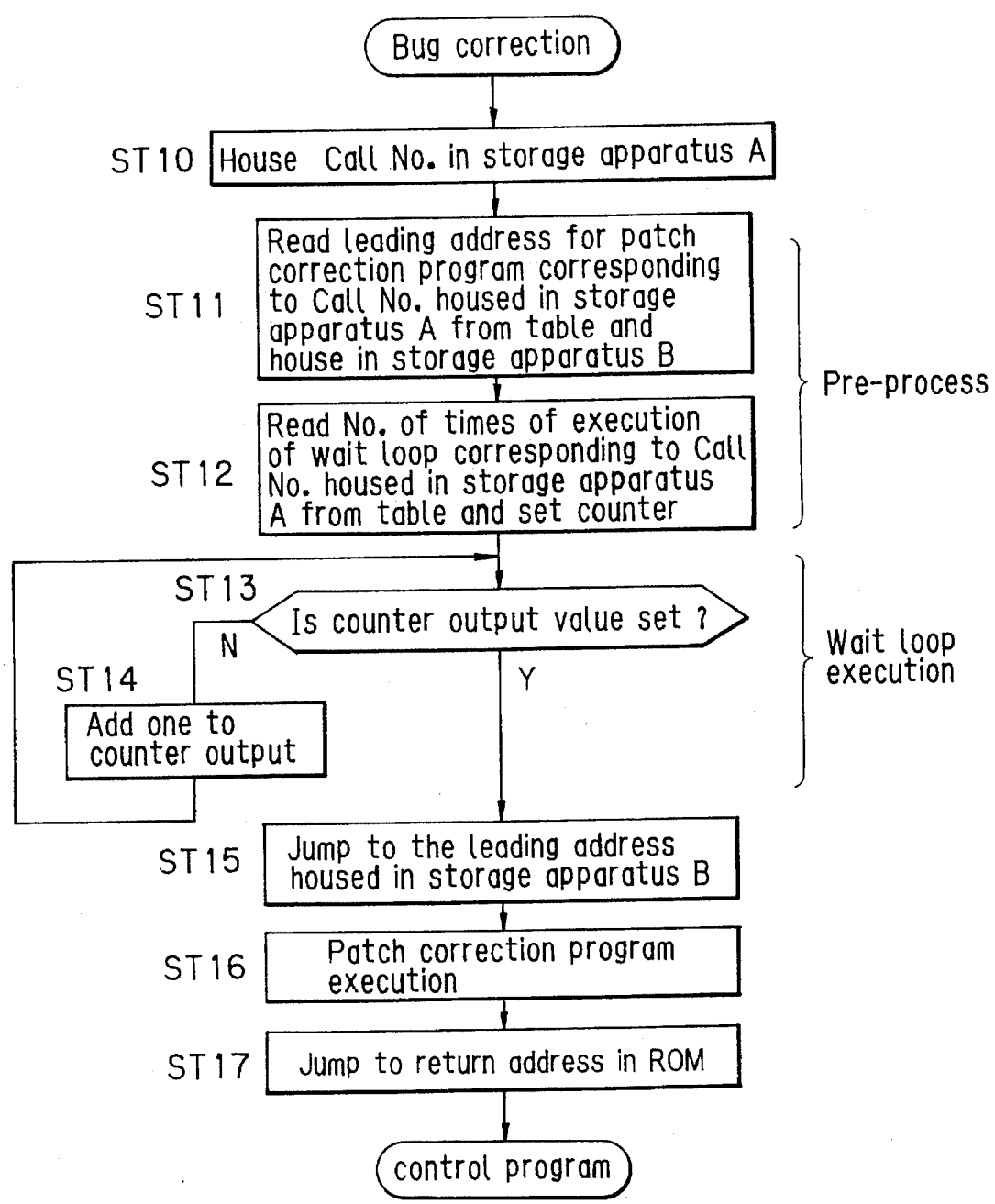
FIG. 5 is a flowchart of bug correction occurring in the embodiment of FIG. 4.

Next, a description of the process for carrying out bug correction using the programs stored in the RAM and ROM will be given with reference to the flowchart of FIG. 5.

As is shown in FIG. 4, call number data showing the numerical order of the next call instruction (i.e. the number of the patch correction program to be executed next) and an instruction indicating that this data is to be stored in storage means A are positioned in the ROM immediately before the call instruction Call X for bug correction. In the bug correction in this embodiment, this data is first read out and stored in the storage apparatus A (ST10 in FIG. 5). The RAM may also be used as the storage means in addition to its other purposes or an exclusive register can be used. This point is the same for the storage apparatus B to be described next.

Next, when the reading out and storing have been completed, the call instruction calls the ROM address X which houses the programs for carrying out the pre-process and wait loops and the execution of these programs is commenced. In this pre-process, the call number data stored in the storage means A is determined, the leading address of the patch correction program in the RAM which corresponds to this call number is read out from the table and is then stored in the storage means B (ST11). Also, the number of times which the wait loop is to be repeated prior to the execution of this patch correction program is read from the table and set up into a counter to be used in the execution of the wait loop (ST12).

Upon completion of the pre-process, after the time adjustment has been carried out by executing the wait loop the number of times set in step 12 (ST13 and ST14), the leading address of the patch correction program stored in storage means B is jumped to (ST15). After the patch execution program in the RAM has been executed (ST16), the program in the ROM is returned to and the control program is re-commenced (ST17).

The present invention relates to an electronic apparatus capable of carrying out the kind of bug correction described above. However, the invention is by no means limited to the construction in the kind of embodiments described above, and various kinds of construction modifications are possible. For example, in FIG. 2 and FIG. 4, processes such as A and B for controlling the television unit can be set to be an optional number, as can the number of corresponding bug corrections.

Although in the embodiment in FIG. 4, the wait loop execution program is set up in the ROM, this could be set up in the RAM. Further, the execution of the wait loop program could take place from when the patch correction program is executed, various design variations may be suggested by persons skilled in the art within the scope of the basic technological concept of this invention.

As described above in detail, whereas conventionally, if a bug was discovered after mass production or it became necessary to modify a just a particular part, it would have been necessary to, for example, attach an external circuit, or the production run for the electronic apparatus would have to be carried out again which would be very expensive, according to the present invention, an electronic device is provided wherein bugs can be corrected quickly and easily, Simply by using correction information provided externally.

Further, whereas previously the length of the patch correction program varied depending on the nature of the bug, in this invention, by using data where the time period can be corrected within the bug correction, the overall time necessary for bug correction can be made constant, irrespective of the length of the patch correction program so that the timing for the control of the equipment to be controlled can be made always constant irrespective of the length of the operation time for the patch correction thereby allowing a stable control operation to be carried out.

What is claimed is:

1. An electronic apparatus integrated as one body, comprising in an integrated form:

permanent storage means for permanently storing information, the permanent storage means having a specific part containing incorrect information;

correction information storage means for storing correction information for correcting the incorrect information in the specific part of the permanent storage means;

central arithmetic processing means for arithmetic processing and for carrying out access control between said permanent storage means and said correction information storage means for performing a bug correction; and input means for inputting the correction information to the correction information storage means, said correction information including patch correction data for correcting the incorrect information stored in said specific part of the permanent storage means, the correction information also including data for increasing a length of time for performing said bug correction beyond a time required to execute said patch correction data.

2. An electronic apparatus according to claim 1, wherein: said data for increasing the length of time for performing said bug correction beyond the time required to execute said patch correction data includes one or more invalid instructions.

3. An electronic apparatus according to claim 1, wherein: said data for increasing the length of time for performing said bug correction beyond the time required to execute said patch correction data includes data for setting a number of times a wait loop is repeated.

4. An electronic apparatus according to claim 3, wherein: said permanent storage means includes an execution program for executing said wait loop.

5. An electronic apparatus according to claim 1, 2 or 3, wherein: said central processing means changes the access between said permanent storage means and said correction information storage means in synchronism with a television synchronization signal.

6. An electronic apparatus according to claim 3, wherein: said television synchronization signal is a vertical synchronization signal.

7. An electronic apparatus according to claim 1, wherein said input means reads the correction information stored in an EEPROM and transmits said correction information to said correction information storage means.

8. An electronic apparatus, comprising:

permanent storage means for permanently storing information, the permanent storage means having a first specific part containing a first amount of incorrect information, the permanent storage means also having a second specific part containing a second amount of incorrect information;

correction information storage means for storing correction information for correcting the first and second specific parts;

central arithmetic processing means for arithmetic processing and for carrying out access control between said permanent storage means and said correction information storage means, the central arithmetic processing means carrying out access control between said permanent storage means and said correction information storage means for performing a first bug correction and a second bug correction; and input means for inputting the correction information to the correction information storage means, said correction information including first patch correction data for correcting the first amount of incorrect information, second patch correction data for correcting the second amount of incorrect information, and data for increasing a length of time for performing said first and second bug corrections so that the length of time for performing the first and second bug corrections is substantially constant.

9. An electronic apparatus according to claim 8, wherein: said data for increasing the length of time for performing said first and second bug corrections includes one or more invalid instructions.

10. An electronic apparatus according to claim 8, wherein: said permanent storage means includes an execution program for executing a wait loop.

\* \* \* \* \*